(12) United States Patent
McConaghy et al.

(10) Patent No.: US 9,483,602 B2
(45) Date of Patent: Nov. 1, 2016

(54) METHOD AND SYSTEM FOR IDENTIFYING RARE-EVENT FAILURE RATES

(75) Inventors: Trent Lorne McConaghy, Vancouver (CA); Joel Cooper, Saskatoon (CA); Jeffrey Dyck, Saskatoon (CA); Kyle Fisher, Saskatoon (CA)

(73) Assignee: SOLIDO DESIGN AUTOMATION INC., Saskatoon (CA)

( * ) Notice: Subject to any disclaimer, the term of this patent is extended or adjusted under 35 U.S.C. 154(b) by 692 days.

(21) Appl. No.: 13/881,866

(22) PCT Filed: Oct. 27, 2011

(86) PCT No.: PCT/CA2011/050673
§ 371 (c)(1),
(2), (4) Date: Apr. 26, 2013

(87) PCT Pub. No.: WO2012/055045
PCT Pub. Date: May 3, 2012

(65) Prior Publication Data
US 2013/0226544 A1   Aug. 29, 2013

Related U.S. Application Data

(60) Provisional application No. 61/407,230, filed on Oct. 27, 2010.

(51) Int. Cl.
*G06F 17/50* (2006.01)
*G06G 7/62* (2006.01)

(52) U.S. Cl.
CPC ....... *G06F 17/5081* (2013.01); *G06F 17/5009* (2013.01); *G06F 17/5022* (2013.01); *G06F 17/5036* (2013.01); *G06F 2217/10* (2013.01)

(58) Field of Classification Search
CPC .......... G06F 17/5009; G06F 17/5022; G06F 17/5036; G06F 17/5081; G06F 2217/10
USPC ........................................ 703/13, 14, 16, 17
See application file for complete search history.

(56) References Cited

U.S. PATENT DOCUMENTS

| 6,892,366 B1 | 5/2005 | Teig et al. |
| 8,155,938 B2 * | 4/2012 | Singhee ............. G06F 17/5036 703/6 |

(Continued)

OTHER PUBLICATIONS

Wang et al., "SRAM Parametric Failure Analysis", 46th ACM/IEEE Design Automation Conference, Jul. 26-31, 2009, pp. 496-501.

(Continued)

*Primary Examiner* — Aniss Chad
(74) *Attorney, Agent, or Firm* — Louis B. Allard; Borden Ladner Gervais LLP

(57) ABSTRACT

A method and system to estimate failure rates in designs. N Monte Carlo samples are drawn from the random distribution that describes process variation in the design. A subset of these samples is selected, and that subset of $N_{init}$ samples are simulated (with a circuit simulator) to measure a performance value for each sample. A model is constructed, using the values of the $N_{init}$ process points as training inputs, and the corresponding $N_{init}$ performance values as training outputs. The candidate Monte Carlo samples are from the N Monte Carlo samples that have not yet been simulated. Each candidate is simulated on the model to get predicted performance values, and the samples are ordered in ascending (or descending) order of the predicted performance values. Simulation of candidates samples is then begun, in that order. The sampling and simulation will stops once there is sufficient confidence that all failures are found.

18 Claims, 17 Drawing Sheets

(56) References Cited

U.S. PATENT DOCUMENTS

| | | | |
|---|---|---|---|
| 8,195,427 B2* | 6/2012 | Tiwary | G01R 31/2894 702/181 |
| 9,147,031 B2* | 9/2015 | Radens | G06F 17/5036 |
| 2006/0203581 A1 | 9/2006 | Joshi et al. | |
| 2008/0195325 A1 | 8/2008 | Joshi et al. | |
| 2009/0248387 A1 | 10/2009 | Singhee et al. | |

OTHER PUBLICATIONS

International Patent Application No. PCT/CA2011/050673, International Search Report dated Dec. 13, 2011.

Gu et al., "An efficient, fully nonlinear, variability-aware non-Monte-Carlo yield estimation procedure with applications to SRAM cells and ring oscillators," Asia and South Pacific Design Automation Conference, 2008, pp. 754-761.

Metropolis, et al., "Equations of State Calculations by Fast Computing Machines," Journal of Chemical Physics, Jun. 1953, vol. 21, No. 6, pp. 1087-1092.

Kanoria et al., "Statistical Static Timing Analysis Using Markov Chain Monte Carlo", Proc. Design Automation and Test Europe, Mar. 2010, 6 pages.

Qazi et al. "Loop Flattening & Spherical Sampling: Highly Efficient Model Reduction Techniques for SRAM Yield Analysis," Proc. Design Automation and Test in Europe, Mar. 2010, 6 pages.

Friedman, "Multivariate Adaptive Regression Splines", The Annals of Statistics, Mar. 1991, vol. 19, No. 1, pp. 1-67.

McConaghy, "High-dimensional statistical modeling and analysis of custom integrated circuits", Proc. Custom Integrated Circuits Conference, Sep. 2011, 8 pages.

Halton, "On the efficiency of certain quasi-random sequences of points in evaluating multi-dimensional integrals", Numerische Mathematik, 1960, vol. 2, pp. 84-90.

Hammersley, "Monte Carlo methods for solving multivariate problems", Annals of NY Academy of Sciences, 1960, vol. 86, pp. 844-874.

Wilson, "Probable inference, the law of succession, and statistical inference", Journal of the American Statistical Association, Jun. 1927, vol. 22, No. 158, pp. 209-212.

English Translation of Taiwan Patent Application No. 100139139 Office Action dated Dec. 24, 2015.

* cited by examiner

US 9,483,602 B2

METHOD AND SYSTEM FOR IDENTIFYING RARE-EVENT FAILURE RATES

CROSS REFERENCE TO RELATED APPLICATIONS

This application is the National Stage of International Application No. PCT/CA2011/050673, filed on Oct. 27, 2011. International Application No. PCT/CA2011/050673 claims the benefit of priority of U.S. Provisional Patent Application No. 61/407,230 filed Oct. 27, 2010. Both International Application No. PCT/CA2011/050673 and U.S. Provisional Patent Application No. 61/407,230 are incorporated herein by reference in their entirety.

FIELD

The present invention relates generally to estimating failure rates in designs (e.g., electrical circuit designs) that have performance influenced by variation, where the variation is modeled at least in part by a probability distribution, and the probability of failing specifications is significantly lower than the probability of passing. More particularly, the present invention relates to estimating failure rates in high yield semiconductor designs.

BACKGROUND

The yield of memory, custom digital, and other types of circuits is important because it directly affects the profitability of the chip on which the circuit in question is formed. Accordingly, it is important for designers to be able to estimate the yield of these circuits prior to their manufacture. As is known in the art, a failure rate is simply another unit related to yield. That is, the failure rate of a design is the proportion of sampled designs that fail specifications, whereas yield is the proportion of designs that pass.

To estimate failure rate of an electrical circuit design (ECD), there usually comes in play a model of statistical variation of some variables of the ECD. That model of variation can include a probability distribution of random variables. For example, each device in the ECD could have an n-dimensional Gaussian distribution describing variation in "n" process variables of that device such as oxide thickness, substrate doping concentration, etc. Then, the model of distribution (probability distribution) for the ECD is merely the union of the devices' distributions. Drawing a random point from the distribution, combined with the ECD's topology and device sizes (length, width, etc), provides an "instance" of the ECD, the instance being a model of a single chip (die) that might be manufactured (or a block or "cell" within the overall chip design).

The performance of an instance of an ECD is typically estimated via circuit simulation. Its performance can be estimated at various environmental points, for example at different temperatures. The instance of the ECD is "feasible" if the performances at each environmental point meet specifications. The performances, also referred to as performance metrics, can include, e.g., power consumption, read current, etc.

A simple, known way to estimate failure rate for a given ECD uses Monte Carlo sampling with simulation, as shown in FIG. 1. The inputs used at the start 102 include a representation of an ECD, and a probability distribution describing the variations that can affect the ECD. An instance—a combination of a ECD (nominal design), and a particular variation (due to process randomness)—can be simulated by a SPICE circuit simulator (SPICE: Simulation Program with Integrated Circuit Emphasis) or the like. In step 104, a number of instances are drawn from the ECD's probability distribution. Each instance is simulated 106, to determine whether it is "feasible" or not (i.e., if it meets, or not, pre-determined specifications of the performance metrics). The run typically stops 108 when all N samples have been simulated. The results are reported to the user display 110, including the failure rate, which is calculated as the ratio of the number of infeasible instances, over the total number of instances.

Estimating failure rate according to the Monte Carlo flow of FIG. 1 is relatively inexpensive when the probability of finding an infeasible instance (failure rate) is within the same order of magnitude or two, compared to the probability of finding a feasible instance. For example, if the failure rate ($p_f$) is 0.10, then the yield is 0.90 and it is relatively inexpensive to estimate. To estimate failure rate with decent accuracy, a reasonable rule of thumb is to have enough samples to get about ten failures; and more samples will improve the accuracy further. In the example above, $p_f$=0.10 leads to N=10/0.10=100 samples. On a modern CPU with modern simulation software, 100 Monte Carlo samples can be typically simulated in minutes to hours, which is reasonable. 1000 Monte Carlo samples can often be reasonable, and 10,000 samples for certain fast-simulating circuits can also be reasonable.

However, if the probability of an instance failing is much more rare, one needs, using the approach shown at FIG. 1, far more Monte Carlo samples to estimate the failure rate. For example, if $p_f$=1.0 e-6 (1 in a million), then one would need about N=10/1 e-6=10 million Monte Carlo samples. In this case, simulating the ECD can be too computationally intensive for modern machines to obtain results in a reasonable time frame (e.g., hours). If, for a given circuit, $p_f$=1.0 e-9 (1 in a billion), then one would need about N=10/1 e-9=10 billion Monte Carlo samples. Simulating on such a huge number of samples would clearly be unreasonable with respect to the required time frame.

Such low $p_f$ values are actually common in certain types of modern circuits. Among such circuits are memory circuits, where bitcells are repeated millions or billions of times (Mbit or Gbit memories) on a single chip; therefore each bitcell should preferably be extremely reliable (have a tiny $p_f$) so that the overall memory has reasonable yield; and support circuitry such as sense amps, which are also repeated often, also need to be very reliable. Further, digital electronics have so many digital standard cells, that each cell should preferably be extremely reliable so that the overall circuit has decent yield.

Since simulating 10 million or 10 billion Monte Carlo samples is unreasonably expensive, other approaches to estimate failure rate have been explored.

One approach is to do a smaller number of Monte Carlo samples (10,000 to 1 million), simulate them, construct a model of the tail of the distribution, then to extrapolate the tail to find where the tail crosses the feasibility boundary (pass/fail boundary for a particular performance metrics). Unfortunately, this is very computationally expensive; and the extrapolation can be quite inaccurate.

Another approach is to construct an analytical model of the ECD, and to either draw a huge number of samples from that model, or derive the failure rate by analytically integrating the model. Unfortunately, this also can be very inaccurate. Further, this approach requires time-consuming tedious manual labor that must be repeated for every different circuit schematic, and possibly revised with every new manufacturing process node.

Another set of approaches is to use classification or regression models. The core idea is that models can evaluate a sample's feasibility far faster than simulation. One such approach (A. Singhee et al, "Method and apparatus for sampling and predicting rare events in complex electronic devices, circuits and systems", U.S. patent application 20090248387 filed Mar. 28, 2008) draws Monte Carlo samples from the distribution, and uses a feasible/infeasible classifier in place of simulation when it has confidence in its prediction of feasibility. Another approach (J. Wang, S. Yaldiz, X. Li and L. Pileggi, "SRAM Parametric Failure Analysis," Proc. ACM/IEEE Design Automation Conference, June 2009) adaptively builds a piecewise-linear model; it starts with a linear regression model and, at each iteration, chooses a higher-probability random point with known modeling error or uncertainty, simulates, and adds another "fold" to the model. A further approach (C. Gu and J. Roychowdhury, "An efficient, fully nonlinear, variability-aware non-Monte-Carlo yield estimation procedure with applications to SRAM cells and ring oscillators," Proc. 2008 Asia and South Pacific Design Automation Conference, 2008, pp. 754-761) is similar to the previous, but uses a classification model rather than regression model. The general problem of model-based approaches is that one should be able to trust the model; if the model is inaccurate, then the results will be inaccurate. These approaches have only been demonstrated on tiny problems of just 6-12 variables; having a reliable model on 50 or 150 or more variables is far more difficult.

An additional approach uses Markov Chain Monte Carlo (MCMC). This approach is derived from the famous Metropolis-Hastings algorithm (N. Metropolis, A. W. Rosenbluth, M. N. Rosenbluth, A. H. Teller, E. Teller, "Equations of State Calculations by Fast Computing Machines," Journal of Chemical Physics 21 (6), 1953, pp. 1087-1092). In the MCMC approach for statistical sampling (Y. Kanoria, S. Mitra and A. Montanari, "Statistical Static Timing Analysis using Markov Chain Monte Carlo", Proc. Design Automation and Test Europe, March 2010), the sampling distribution is adaptively tilted towards the rare infeasible events, and each subsequent sample in the "chain" of samples is used or rejected stochastically based on a threshold. Unfortunately, a stable "well-mixed" chain of MCMC samples is difficult to achieve reliably in practice, especially for non-experts in MCMC (i.e., tool users).

Another set of approaches uses importance sampling. A representative example is: R. Joshi et al, "System and Computer Program for Efficient Cell Failure Rate Estimation in Cell Arrays," U.S. Patent Application Publication No. 2008/0195325, filed Apr. 16, 2008. In importance sampling, the distribution is shifted towards rare infeasible samples, just like MCMC. But unlike MCMC, importance sampling uses every sample. When estimating failure rate, it gives a weight to each sample according to its density on the sampling distribution, compared to its density on the true distribution. In the most promising importance sampling approaches for circuit analysis, "centers" are computed and subsequently used in importance sampling, where the centers are the means of Gaussian distributions. In the work by R. Joshi et al., centers are computed by drawing samples from a uniform distribution in the range of [−6, +6] standard deviations for each process parameter, and keeping the first 30 infeasible samples. The approach (M. Qazi, M. Tikekar, L. Dolecek, D. Shah, and A. Chandrakasan, "Loop Flattening & Spherical Sampling: Highly Efficient Model Reduction Techniques for SRAM Yield Analysis," Proc. Design Automation and Test in Europe, March 2010) chooses centers via a spherical sampling technique. Both of these works were demonstrated on tiny problems of just 6-12 variables. Unfortunately, they work poorly in larger numbers of dimensions (random variables), because the chosen centers are too improbable; therefore the weights are too small to affect the failure rate estimate; causing the estimate to be far too optimistic, e.g., by reporting a $p_f$ of 1 e-200 when it should be around 1 e-8. In real-world circuit yield-estimation problems, there can be 100 or 1000 or more random variables, as such, Importance Sampling cannot be considered as a reasonable approach in estimating failure. Another disadvantage of Importance Sampling systems are the lack of transparency to a designer using such a tool—it is difficult for the designer to assess the nature of the altered distribution, and whether the distribution samples adequately along the feasibility boundary of highest probability.

Therefore, improvements in estimating failure rates in ECD's are desirable.

SUMMARY

It is an object of the present invention to obviate or mitigate at least one disadvantage of previous tools and methods to estimate the failure rate for ECDs that have a low probability of failure.

In an embodiment of the present disclosure, a set of N Monte Carlo samples (points) are drawn from the random distribution that describes variation. Then, a subset of these samples is selected randomly, and that subset of $N_{init}$ samples are simulated (with a circuit simulator) to measure a performance value for each sample. Then, a regression model is constructed, using the $N_{init}$ points as training inputs, and the corresponding $N_{init}$ performance values as training outputs. The candidate Monte Carlo samples are from the N Monte Carlo samples that have not yet been simulated. Each candidate is simulated on the regression model to get predicted performance values, and the samples are ordered in ascending (or descending) order of the predicted performance values. Simulation of the ordered candidate samples is then begun, in that order. That is, the candidates are simulated starting with the worst output candidate. The regression model and ordering may be periodically updated, as discussed further below. The sampling and simulation will stop once there is sufficient confidence that all failures are found.

Alternatively, N Monte Carlo or Quasi Monte Carlo samples are drawn from the random distribution that describes variation. Then, for each performance (output), a regression model that maps variation parameters to performance is constructed, having feedback from a simulator that gives performance values for a given sample (point). The candidate Monte Carlo samples are from the N Monte Carlo samples that have not yet been simulated. For each regression model (each output), each candidate sample is simulated on the regression model to get predicted performance values, and the samples are ordered in ascending (or descending) order of the predicted performance values (for that output). These orders are merged into a single order in an interleaved fashion. Simulation of candidate samples is then begun, in that order. In addition, simulations of non-candidate points (points not from the set of N Monte Carlo samples) or late-ordered candidate points (points in the set, but not early in the order) may also be done automatically, for example with the aim of improve the quality of the ordering model. The regression model and ordering may be periodically updated. The sampling and simulation will stop once there is sufficient confidence that all failures are found.

The major advantage of the invention compared to prior art, is that while it uses modeling to learn about the problem space (for efficiency), it does not require high model accuracy unlike the other modeling approaches. It uses the models to merely order the samples, rather than using the models to make a decision about whether a sample is feasible or infeasible. The latter usage of models requires far better model accuracy, which is difficult to achieve in high-dimensional problems.

In aspect of the present disclosure, there is provided, a non-transitory, tangible computer-readable medium having recorded thereon instructions for execution by a computer to carry out a method to identify rare-event failures of an electrical circuit design (ECD), the ECD having associated thereto process variables and performance metrics, the performance metrics being dependent on the process variables, the process variables having a probability distribution. The method comprises: generating a set of points (which can be referred to as process points) from the probability distribution of the process variables; selecting a subset of points from the set of points; simulating the ECD for each point of the subset of points, to obtain simulation data; in accordance with the simulation data, calculating a value of a performance metric for each point of the subset of points, to obtain a set of performance metric values, the performance metric having associated thereto a target value; in accordance with the set of performance metric values and with the values of the process variables for each point of the subset of points, building a model of the performance metric as a function of the process variables; in accordance with the model, ordering remaining points of the set of points, to obtain ordered remaining points, the ordered remaining points having an order associated thereto; and displaying a count of a number of ECD failures, to obtain a displayed count of ECD failures, by iteratively repeating the following actions a-d, in accordance with the order of the ordered remaining points, until a stop condition is met: (a) simulating an ordered remaining point to obtain simulation data of the ordered remaining point; (b) calculating, in accordance with the simulation data of the ordered remaining point, a value of the performance metric of the ordered remaining point; (c) comparing the value of the performance metric of the ordered remaining point to the target value; and, (d) if the value of the performance metric of the ordered remaining point does not meet the target value, augmenting the displayed count of ECD failures.

In another aspect of the present disclosure, there is provided a non-transitory, tangible computer-readable medium having recorded thereon instructions for execution by a computer to carry out a method to identify rare-event occurrences of an electrical circuit design (ECD), the ECD having associated thereto process variables and performance metrics, the performance metrics being dependent on the process variables, the process variables having a probability distribution. The method comprises: generating a set of points from the probability distribution of the process variables; selecting a subset of points from the set of points; simulating the ECD for each point of the subset of points, to obtain simulation data; in accordance with the simulation data, calculating a value of a performance metric for each point of the subset of points, to obtain a set of performance metric values; in accordance with the set of performance metric values and with the values of the process variables for each point of the subset of points, building a model of the performance metric as a function of the process variables; in accordance with the model, ordering remaining points of the set of points, to obtain ordered remaining points, the ordered remaining points having an order associated thereto; and displaying a plot of a distribution of the values of the performance metric, to obtain a displayed plot, by iteratively repeating the following actions a-c, in accordance with the order of the ordered remaining points, until a stop condition is met: (a) simulating an ordered remaining point to obtain simulation data of the ordered remaining point; (b) calculating a value of the performance metric of the ordered remaining point in accordance with the simulation data of the ordered remaining point; and, (c) incorporating the value of the performance metric of the ordered remaining point into the plot of the distribution of the values of the performance metric.

In yet another aspect of the present disclosure, there is provided A non-transitory, tangible computer-readable medium having recorded thereon instructions for execution by a computer to carry out a method to identify rare-event failures of an electrical circuit design (ECD), the ECD having associated thereto process variables and performance metrics, the performance metrics being dependent on the process variables, the process variables having a probability distribution. The method comprises: generating a set of points from the probability distribution of the process variables; selecting a subset of points from the set of points; simulating the ECD for each point of the subset of points, to obtain simulation data; in accordance with the simulation data, for one or more performance metrics of the ECD, calculating a value of the one or more performance metrics for each point of the subset of points, to obtain one or more sets of performance metric values; in accordance with the one or more sets of performance metric values and with the values of the process variables for each point of the subset of points, building a model for each of the one or more performance metrics as a function of the process variables; for each of pre-established regions of interest of output values of each of the one or more performance metrics, in accordance with the model of each of the one or more performance metrics, ordering remaining points of the set of points to obtain sets of ordered remaining points, a number of sets of ordered remaining points being equal to a number or pre-established regions of interest, each pre-established regions of interest of output values having associated thereto a target value; interleaving the sets of ordered remaining points to obtain an ordered interleaved set of points, the ordered interleaved set of points having an order; displaying a count of a number of ECD failures, to obtain a displayed count of ECD failures, by iteratively repeating the following actions a-d, for each of the pre-established regions of interest of output values, in accordance with the order of the ordered interleaved set of points, until a stop condition is met: (a) simulating a point of the ordered interleaved set of points; (b) calculating a value of the performance metric of the point of the ordered interleaved set of points; (c) comparing the value of the performance metric of the point of the ordered interleaved set of points to its associated target value; and, (d) if the value of the performance metric of the point of the ordered interleaved set of points does not meet its associated target value, augmenting the displayed count of the ECD failures.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

Embodiments of the present disclosure will now be described, by way of example only, with reference to the attached Figures.

DETAILED DESCRIPTION

Generally, the present invention provides a method and system for identifying failures and failure rates in ECDs that are subject to random variation (i.e., that have design variables subject to random variations, which can also be referred to a process variations).

Figure 1:
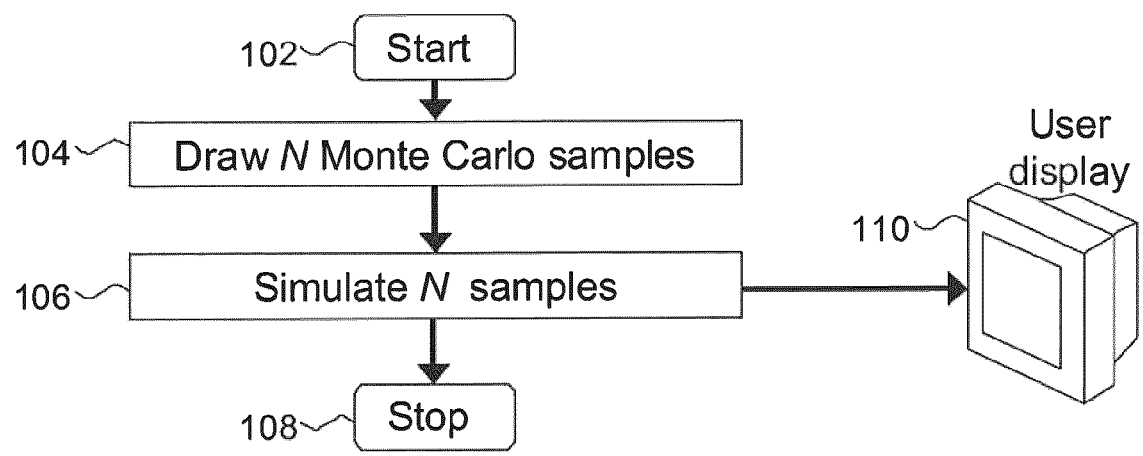
FIG. 1 shows a prior art method of estimating failure rate.
Figure 2:
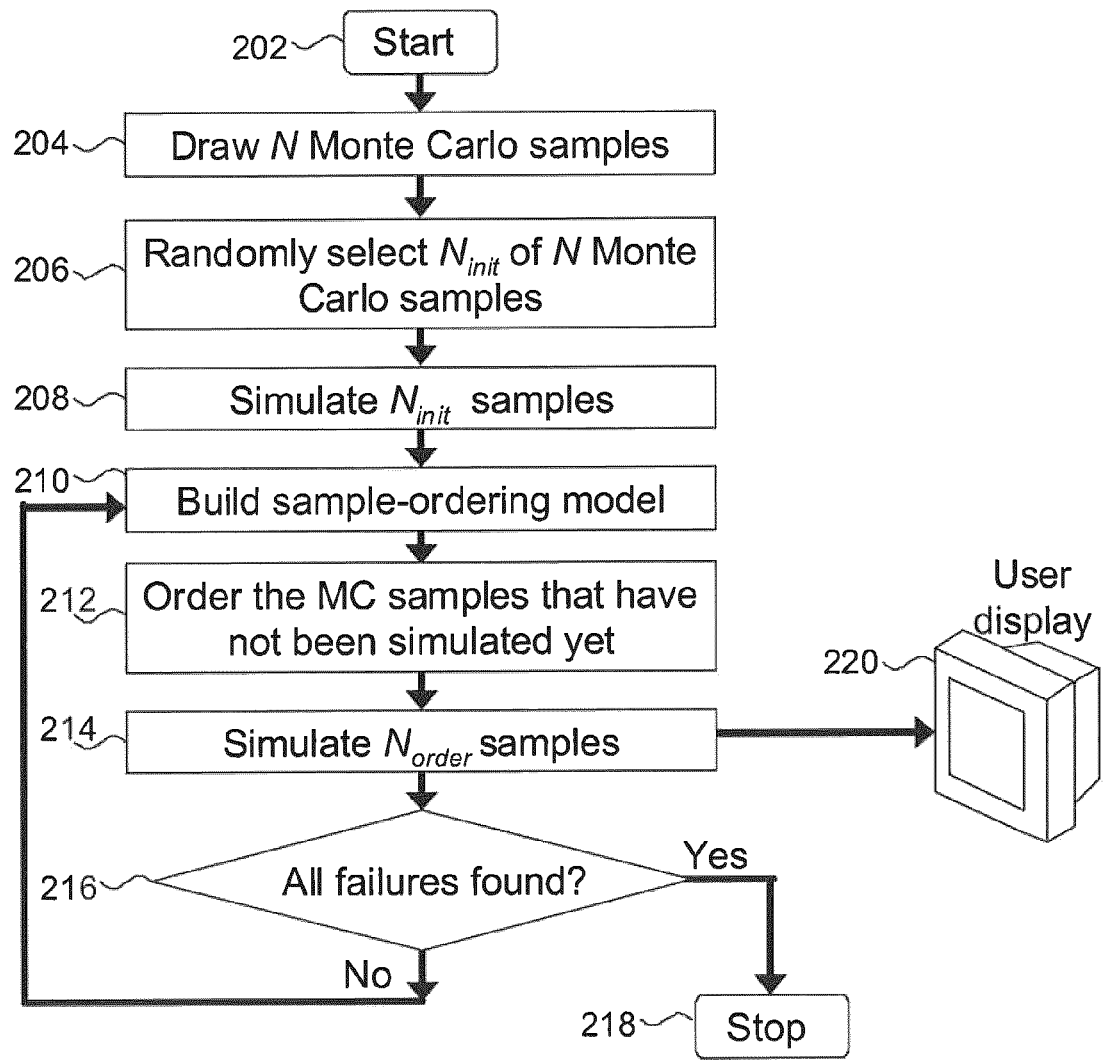
FIG. 2 shows a block diagram illustrating an embodiment of the present disclosure.

The present invention provides a system and method for estimating failure rates efficiently, for ECDs that have a low failure rate. FIG. 2 illustrates an exemplary block diagram of a method/system of the present invention.

In FIG. 2, step 202 is the start. One input to the present invention is a representation of a design (the set of devices, how they are connected, and the device sizings such as width, length, and resistance), and a probability distribution describing the variations that can affect the performance of the circuit. The combination of a design, and a particular variations sample (a point drawn from the variation distribution), can be simulated by a SPICE-like circuit simulator. When a combination of design and variation sample is simulated, a vector of performance values (performance metric values) can be obtained. The following discusses determining the failure rate based on only one performance metric. The general case where multiple performance metrics are in play will be described further below.

At step 204, a set of N Monte Carlo samples (points) are drawn from the random distribution that describes variation of the ECD. Typically, each device of the ECD has variation associated thereto and that variation can be described by a probability distribution of the device's process variables (because they follow a distribution, the process variables are random variables). The set of all probability distributions (one distribution per device) can define the overall probability distribution for the ECD.

Process variables are random in nature and pertain to the process steps involved in manufacturing the ECD. Such variables can include, for example, gate oxide thickness, substrate doping concentration, sheet resistance, mobility, and fluctuations in device length and width, which can ultimately affect the electrical characteristics and performance metrics of the ECD.

Subsequently, at step 206, a subset of $N_{init}$ samples of the N samples is selected randomly, and the ECD is simulated at that subset of $N_{init}$ samples (with a circuit simulator) to obtain a value of a given performance metric (the same performance metric) for each sample 208. Then, at 210 a regression model is constructed for that performance metric, using the $N_{init}$ points as training inputs, and the corresponding $N_{init}$ performance values as training outputs.

Any suitable type of regression model is within the scope of the present disclosure. For example, regression models could include linear models, polynomial models, spline models, Gaussian process models, neural networks, MARS models (J. H. Friedman, Multivariate Adaptive Regression Splines, Annals of Statistics, Vol. 19, No. 1, 1991), FFX (fast function extraction) models (T. McConaghy, High-dimensional statistical modeling and analysis of custom integrated circuits, Proc. Custom Integrated Circuits Conference, September 2011), or combinations thereof; these are all within the scope of the present disclosure. As an example, the bandwidth (BW) of a comparator may be a polynomial function of process variables 'x' according to: $BW=1.71\ e7-4.57\ e5*x_{cm1,m1,lint}*x_{cm1,m2,lint}+5.23\ e4*x^2_{cm1,m1,lint}+4.80\ e4*x^2_{cm1,m2,lint}$; where for example $x_{cm1,m1,lint}$ is variation in length of the transistor M1 on current mirror CM1.

Figure 3:
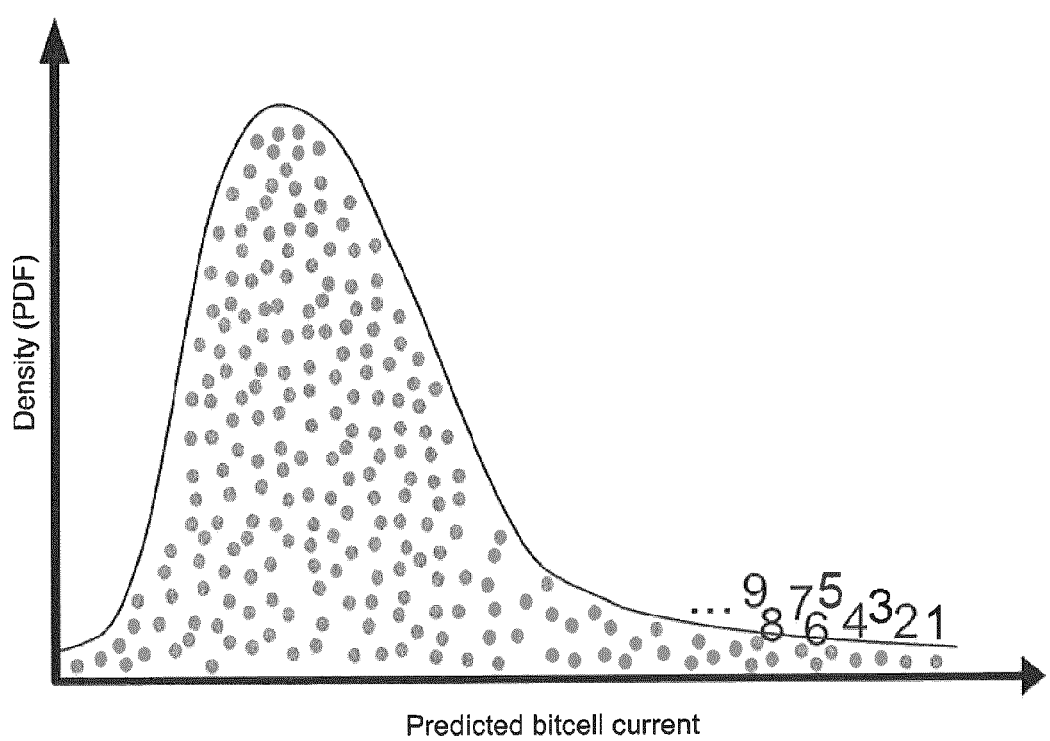
FIG. 3 shows a distribution of bitcell current for a bitcell circuit.

At 212, candidate Monte Carlo samples that have not yet been simulated are simulated on the regression model to get predicted performance values and, also at 212, the candidate samples are ordered in ascending (or descending) order of the predicted performance values. If it is desirable to maximize the output, i.e., the performance metric, which could be, e.g., gain, then the worst-case values are minimum-valued, and the samples are in ascending order. Conversely, if it is desirable to minimize the performance metric (e.g., power consumption) then the samples are ordered in a descending order. In another example, it might be desirable to have, for a bitcell, a bitcell current below a pre-determined value. In such a case, the samples (ordered samples) would be ordered in descending value of their predicted bitcell current. FIG. 3 relates to such an example of current in a bitcell and shows a probability distribution function of Monte Carlo samples as a function of predicted bitcell current—based on the regression model. In this example, the bitcell current specification has a maximum allowable value. As such, the samples are ordered from high predicted current to low predicted current. The first 9 ordered samples are labeled 1-9.

At step 214 of FIG. 2, simulation of the ordered candidates is begun, in the determined order. The samples can be simulated in batches of size $N_{order}$ each. As simulation results come back, results can be output to a user display 220, in the form of, for example, simulated output values, which simulations failed specifications, number of failures obtained, an estimated failure rate assuming all failures are found, and more. The failure rate is estimated as (number of failures)/(total number of samples N). If it is determined at 216, that all failures have been found, then the system will stop at 218. Determination of whether all failures found can be done automatically, or by the user getting feedback from the display. If the system does not stop, then the flow can re-loop to 210. The regression model can be re-trained with the additional data that was just obtained from simulation, and the remaining candidate samples can be re-ordered at 212, and then simulated at 214. The loop can continue until all failures are found. Once all failures are found, the system can stop at 218.

Figure 4:
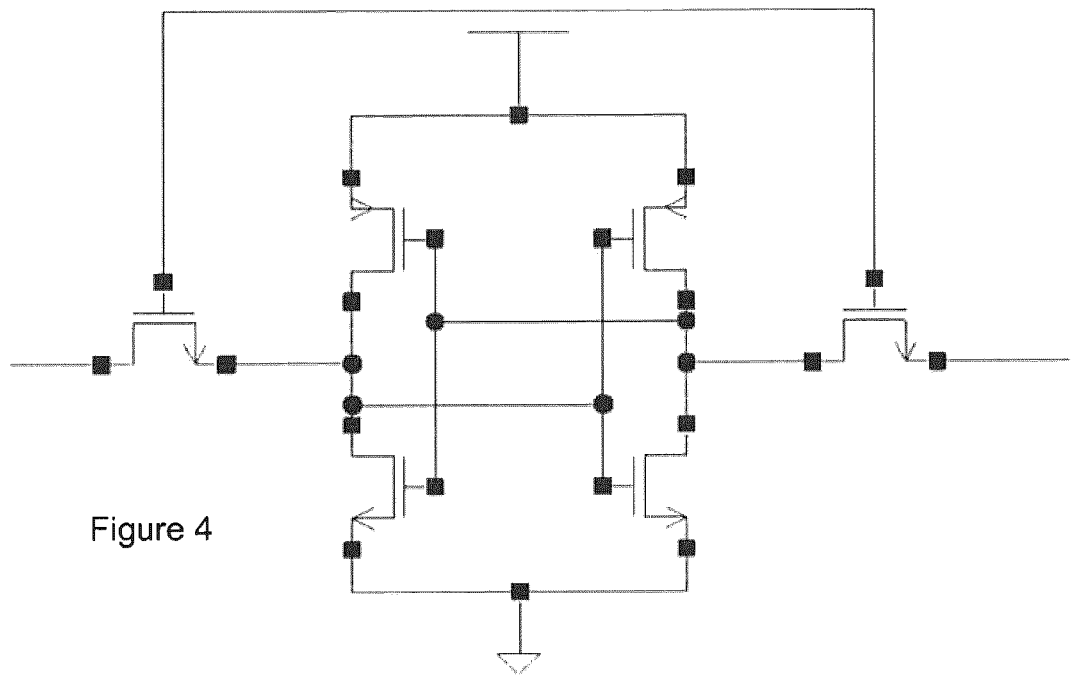
FIG. 4 shows a bitcell circuit diagram.
Figure 5:
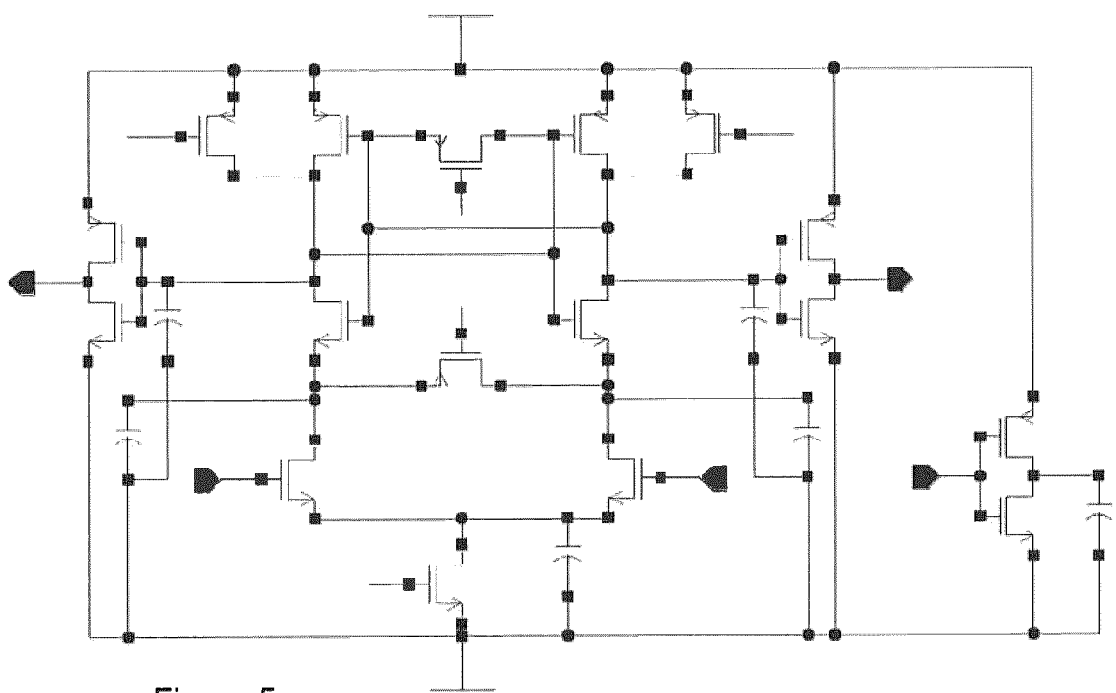
FIG. 5 shows a sense amp circuit diagram.

The following demonstrates the application of the present disclosure to five different high-yield (low $p_f$) problems: three ECDs, one with a single output and two that have two outputs each. The ECDs are a bitcell and a sense amp, which are representative memory circuits, and a flip flop, which is a representative digital standard cell. The circuits have reasonable device sizings; for example they pass specs at nominal and have a reasonable chance of having yield close to the target yield. The device models used are from a modern industrial 45 nm process, having approximately 5-10 local process variables per device. The bitcell has 30 process variables, the sense amp has 125 process variables, and the flip flop has 180 process variables. FIG. 4 shows a circuit diagram of the exemplary bitcell. FIG. 5 shows a circuit diagram of the exemplary sense amp.

The experimental methodology is as follows. For each problem, N Monte Carlo samples (random samples) are drawn from the probability distribution (of the process variables) of the ECD in question and the ECD is simulated, with a circuit simulator, at all of these random samples. These simulations form the "golden" results against which the method of the present disclosure is tested/compared. In these test cases, the output specification can set such that x of the N samples fail spec (x can be equal to, e.g., 100). The output specifications are, for the bitcell, the bitcell current, for the sense amp, the sense amp power and the sense amp delay, and, for the flip flop, the voltage output and the current output.

The exemplary method shown at FIG. 2 was used with the number of drawn (or generated) Monte Carlo samples $N_{gen}$=N, using the same random seed as used to generated the MC samples in the "golden" results above. The method of FIG. 2 ran for 20000 simulations with specs set such that 100 of the $N_{gen}$ samples fail spec. N=1.5 million for the bitcell, 1 million for the sense amp, and 1 million for the flip flop.

Figure 6:
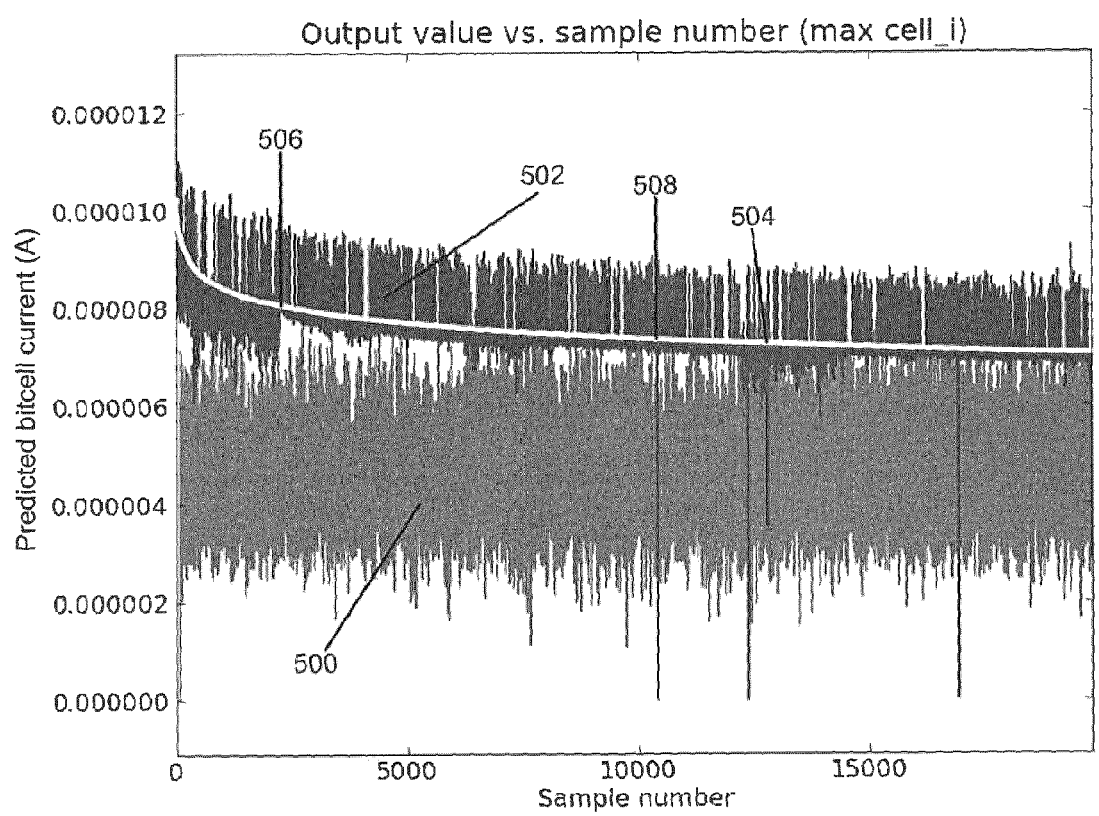
FIG. 6 shows a plot of output current values for the bitcell circuit diagram of FIG. 4.

FIG. 6 plots calculated bitcell current as a function of sample number for 20000 Monte Carlo samples The calculations are performed by simulating the bitcell with a circuit simulator to obtain simulation data and by calculating the bitcell current in accordance with the simulation data. The lower curve 500 is for unordered Monte Carlo samples; the top curve 502 is for the Monte Carlo samples ordered as per the regression model of the bitcell current. The curve 504, is the "ideal" curve if the present method had perfect behavior; as such, this "ideal" curve is useful to compare against the present method. This "ideal" curve 504 shows current obtained for the MC samples that have been ordered as a function of decreasing bitcell current: that is, the bitcell current is obtained for each of the 1.5 million MC samples and the MC samples are ordered as a function of decreasing bitcell current. The regression model is not used to obtain the curve 504. Only 20000 of the MC samples are shown on the curve 504. By definition, the ideal sorting order monotonically decreases, which is consistent with curve 504. The Monte Carlo sampling curve 500 behaves randomly. Having no bias, Monte Carlo samples (points) output values distribute across the whole range, and, as such, simulation of MC samples alone is very slow at finding the worst-case values.

The curve 502 has a general downward trend starting at the worst-case value, with some noise. The trend shows that the curve 502 has captured the general relation from process variables to output value. The noise indicates that the regression model has some error, which is expected. The lower the modeling error, the lower the noise, and the faster the present method shown at FIG. 2 finds failures. At about 2000 samples, indicated at 506, the lower-range values for the curve 502 jump upwards. This is because the model used to estimate the bitcell current was rebuilt at that point, which has made the ordering more accurate from that point on. The model was rebuilt using the simulation results of the simulated (circuit simulated) MC samples: those simulated at the beginning to build the original regression model, and those simulated afterwards to obtain the bitcell current data up to sample number ~2000. simulated In a few cases, such as at about 10,500 samples, indicated at 508, the method shown at FIG. 2 predicted that some points would have extreme-maximum values, but when simulated they had extreme minimum values—that can be acceptable because success in the present method is not dependent on getting every sample predicted within an error tolerance. Rather, success is based on how quickly the method finds the worst cases The curve 502 of FIG. 6 provides transparency into the behavior of the present method, and allows to understand how well method is performing in finding failures. The width of the noise area shows how much margin should be given prior to concluding that all failures have been found for a given specification value (performance metric value). The clear trend shows that the method is working correctly and is generally outlining the tail of the distribution, in the present case, the distribution of bitcell current.

Figure 7:
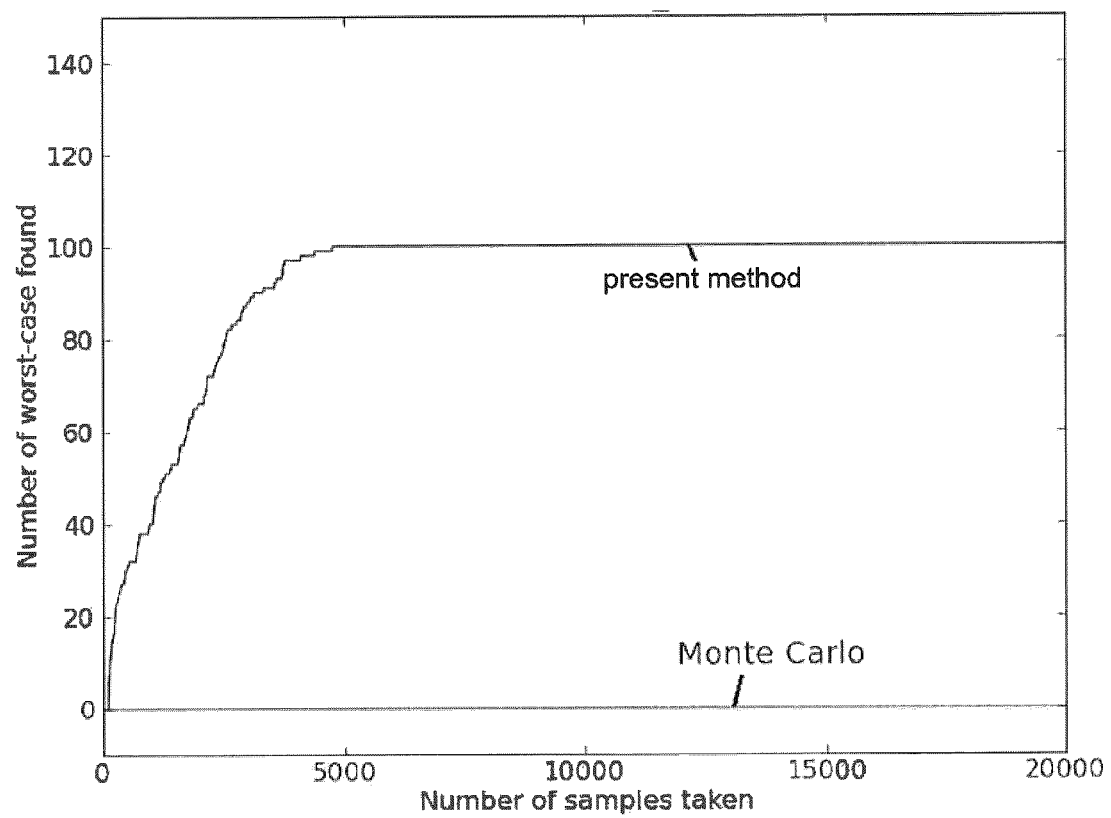
FIG. 7 shows a plot of the number of failures found as a function of sample number for the bitcell circuit of FIG. 4.

The method's effectiveness in finding failures depends on the target specification (target performance metric value). A correct setup (ECD problem setup) can typically include fewer than 100 failures to meet specification within the number of samples generated. If there are more failures, then the ECD is either not meeting its target yield, or there were too many samples generated for the target yield. Similarly, if there are no failures that meet the target specification, then the design either is over-margined or there were not enough samples generated to verify to the target yield. Therefore, the present exemplary method only needs to be able to find up to a hundred failures to meet specification, allowing a tolerance for significant ordering error while still working within acceptable simulations budgets. In the bitcell example, as shown at FIG. 7, the present method finds the first 100 failures within its first 5000 predicted samples. Note that with 1.5 million Monte Carlo samples containing 100 failures, MC simulations will typically not find a single failure within 5000 samples.

The bitcell example demonstrates one of the key strengths of the present method, which is its resilience to order prediction error. The ordering model does not need to be perfectly accurate in order to deliver Monte Carlo and SPICE (circuit simulator) accurate results in the extreme tails of a high-yield distribution within a reasonable number of simulations.

Figure 8:
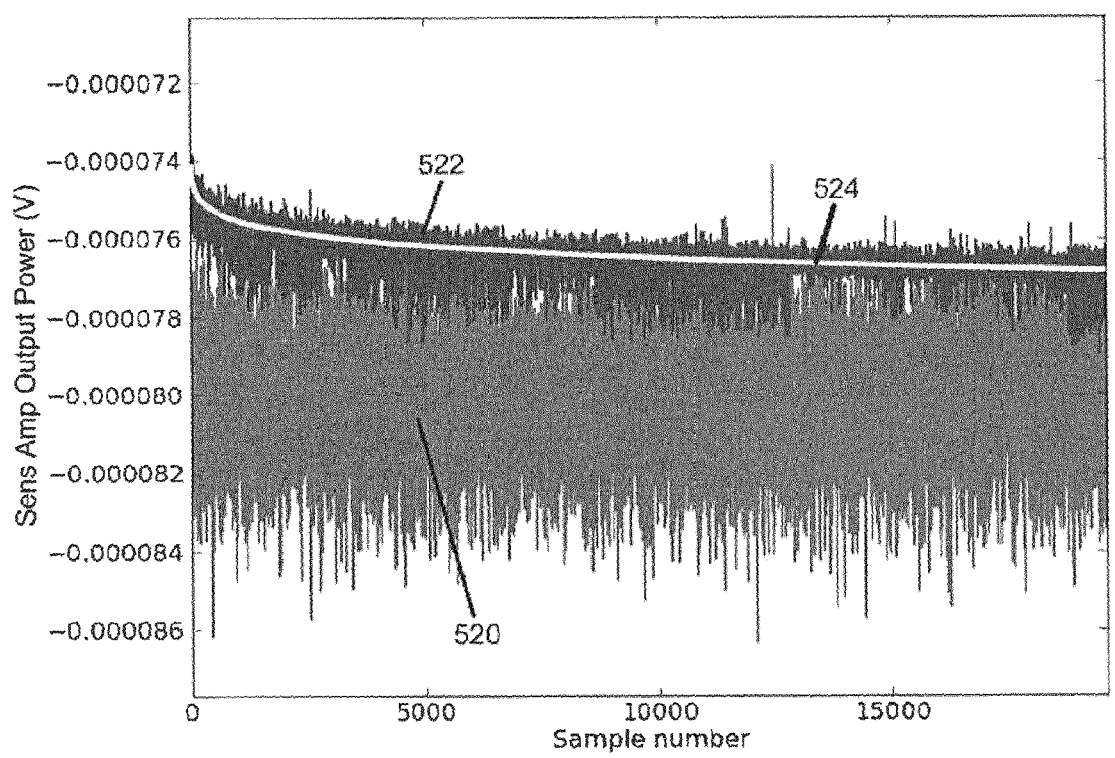
FIG. 8 shows a plot of sense amp output power values for the sense amp circuit of FIG. 5.
Figure 9:
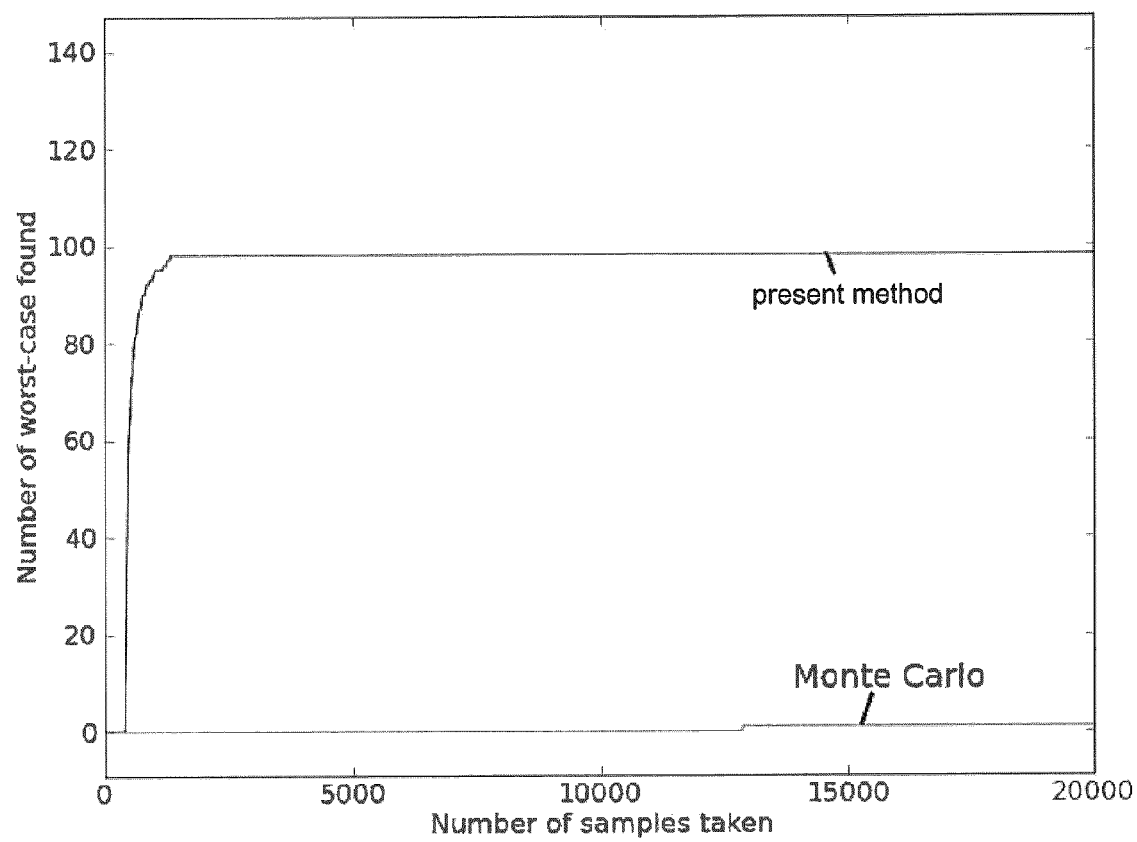
FIG. 9 shows a plot of the number of failures found as a function of sample number for the sense amp circuit of FIG. 5.

FIG. 8 shows curves of calculated Sense Amp power output as a function of sample number for 20000 Monte Carlo samples. The calculations are performed by simulating the Sense Amp with a circuit simulator to obtain simulation data and by calculating the Sense Amp current in accordance with the simulation data. The lower curve 520 is for unordered Monte Carlo samples; the top curve 522 is for the Monte Carlo samples ordered as per the regression model for the Sense amp output power. The 'ideal" curve, curve 524 shows Sense amp output power obtained for the 1 million Monte Carlo samples that have been properly ordered as a function of decreasing Sense amp output power. Only the first 20000 samples are shown in the curve 524. FIG. 9 shows graph of number of failures found as a function of number of MC samples simulated. The general behavior of FIG. 8 and FIG. 9 (related to the Sense amp) is similar to that of FIG. 6 and FIG. 7 (related to the bitcell); however, in the Sense amp case, all 100 failures are found within the first 1000 samples (see FIG. 9). The effect of the ordering model can be seen in FIG. 8, as the amount of noise shown in the curve 522 is clearly lower relative to the noise in the curve 520. As such, the sense amp power example illustrates how the exemplary method of FIG. 2 gains efficiency with a better ordering model. This merely indicates that the sense amp ordering model had lower error than the bitcell ordering model. But the fact that the present method found all failures for the bitcell despite higher error underscores the present method's resilience to higher model errors.

Figure 10:
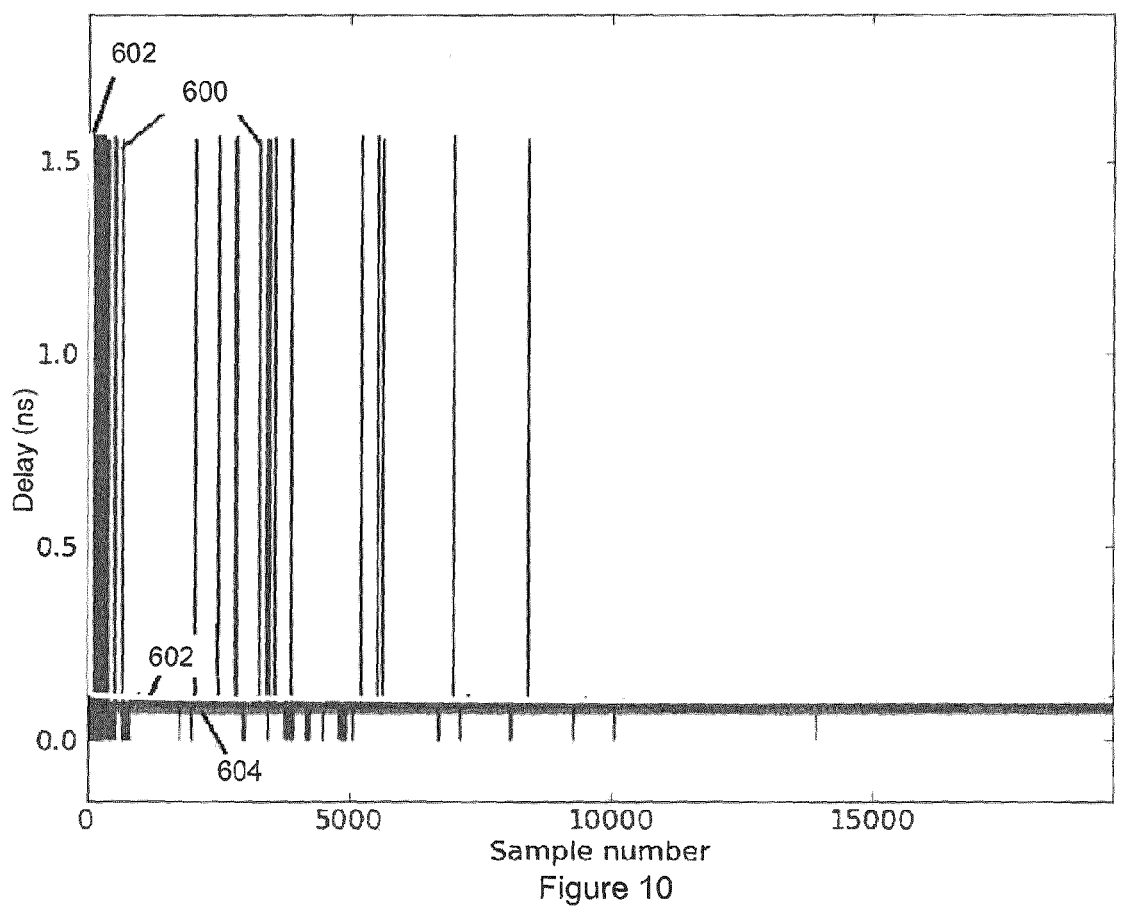
FIG. 10 shows plot of delay for the sense amp circuit of FIG. 5.
Figure 11:
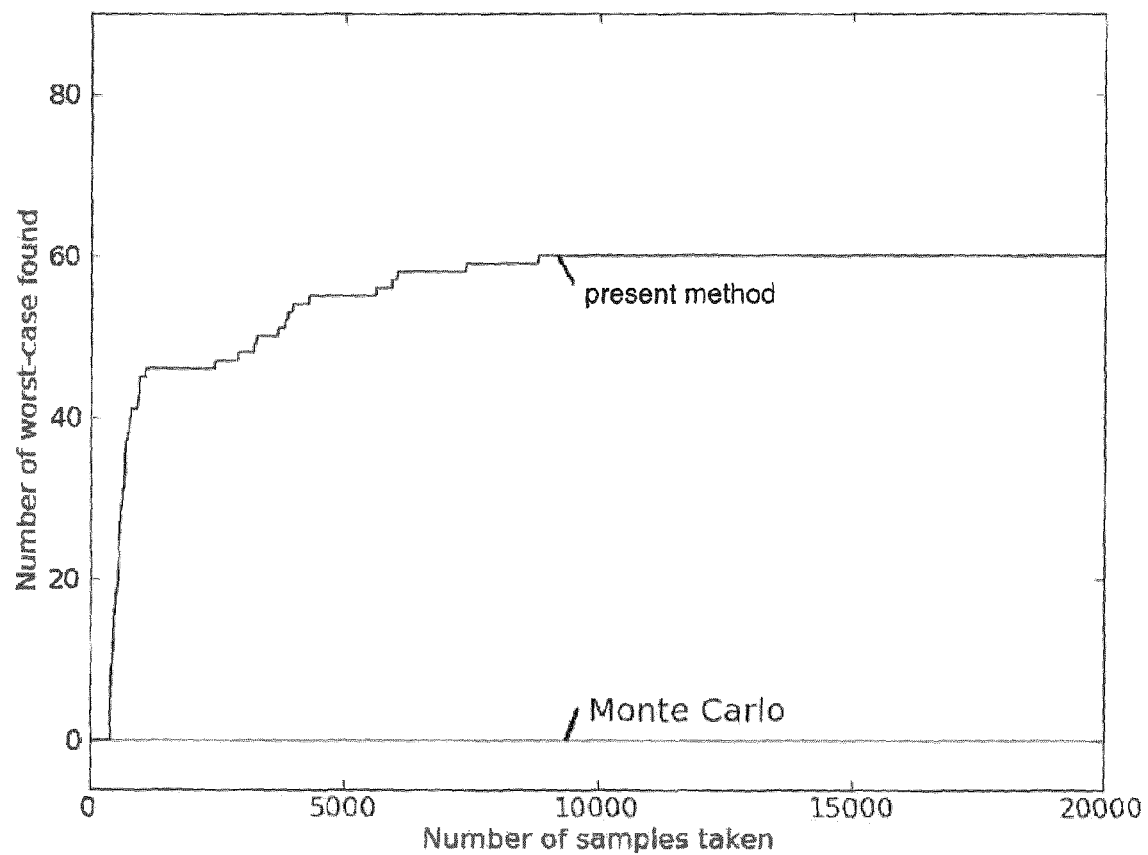
FIG. 11 shows a plot of the number of failures found as a function of sample number for the sense amp circuit of FIG. 5.

FIG. 10 and FIG. 11 shows how the method of FIG. 2 can be applied to the sense amp's delay output. This output has a bimodal distribution, with most sample values being about 0.1 e-9 s (0.1 ns), and failure cases having a value of about 1.5 e-9 s. We set the spec in between. Of the 1 million MC samples, there are 61 failing samples (rather than 100 as in previous examples). FIG. 10 shows that the present method finds all failures within its first 9000 samples. The method finds failures with highest frequency in the earlier samples, with decreasing frequency. We can see visually on the output vs. sample plot in FIG. 10 that the ordering model is good because, in the curve 600, the frequency of failures is high at first, then drops off. We can also see that all failures are likely found because there are no new failures found over a large range of samples (i.e. from sample #9000 to #15000). The ideal curve 602, and the random sampled curve 604 are also shown. FIG. 11 further demonstrates this behavior; there, we see that HSMC finds all 61 failures within 9000 samples, and that it finds most of the failures within the first 1000 samples.

Figure 12:
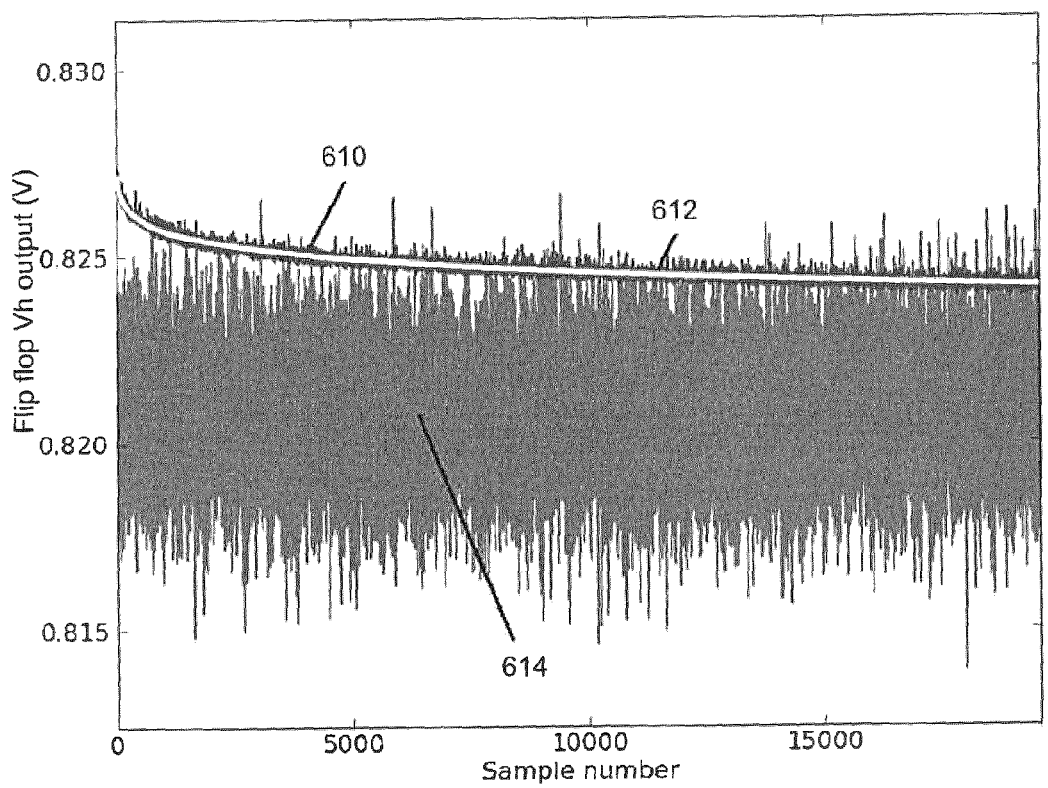
FIG. 12 shows a plot of Vh (voltage high) values as a function of sample number for a flip-flop circuit.
Figure 13:
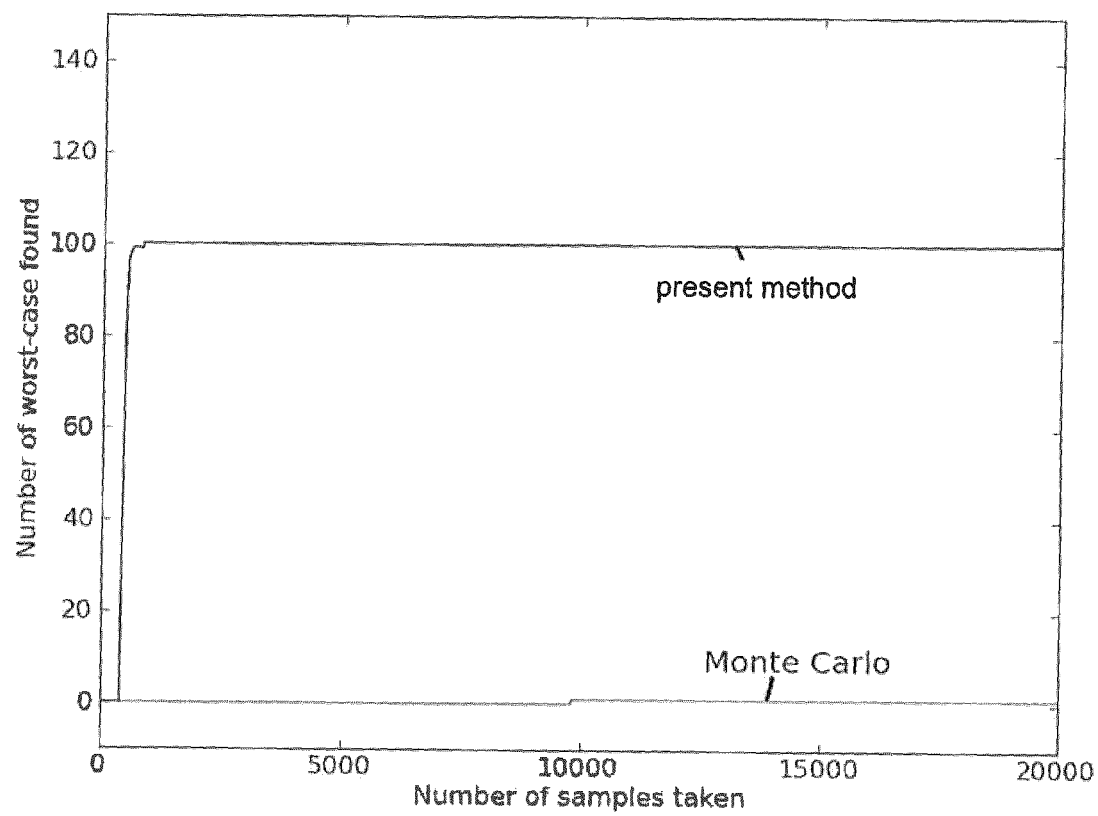
FIG. 13 shows a plot of the number of failures found as a function of sample number for the flip-flop circuit related to FIG. 12.

FIG. 12 and FIG. 13 show HSMC's behavior on the flip flop's Vh output. We see that the curve 610, based on the present method, performs near-ideally in output vs sample convergence, and that the present method finds 100/100 failures in less than 500 samples. The ideal curve is shown at 612, the unordered MC curve is shown at 614.

Note again how visibly small the amount of noise is, in curve 610, relative to the sampling region (curve 614). Again, the amount of noise is a good indicator of the effectiveness of the sample ordering model.

Figure 14:
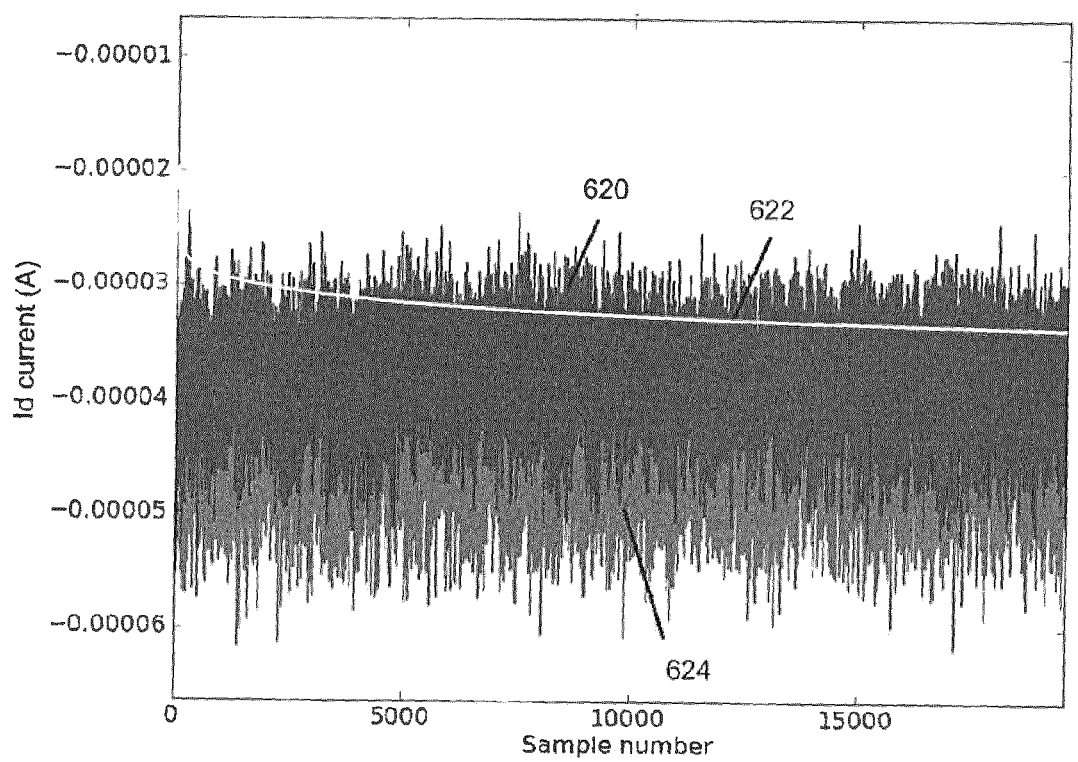
FIG. 14 shows a plot of Id current values as a function sample number of the flip-flop circuit.
Figure 15:
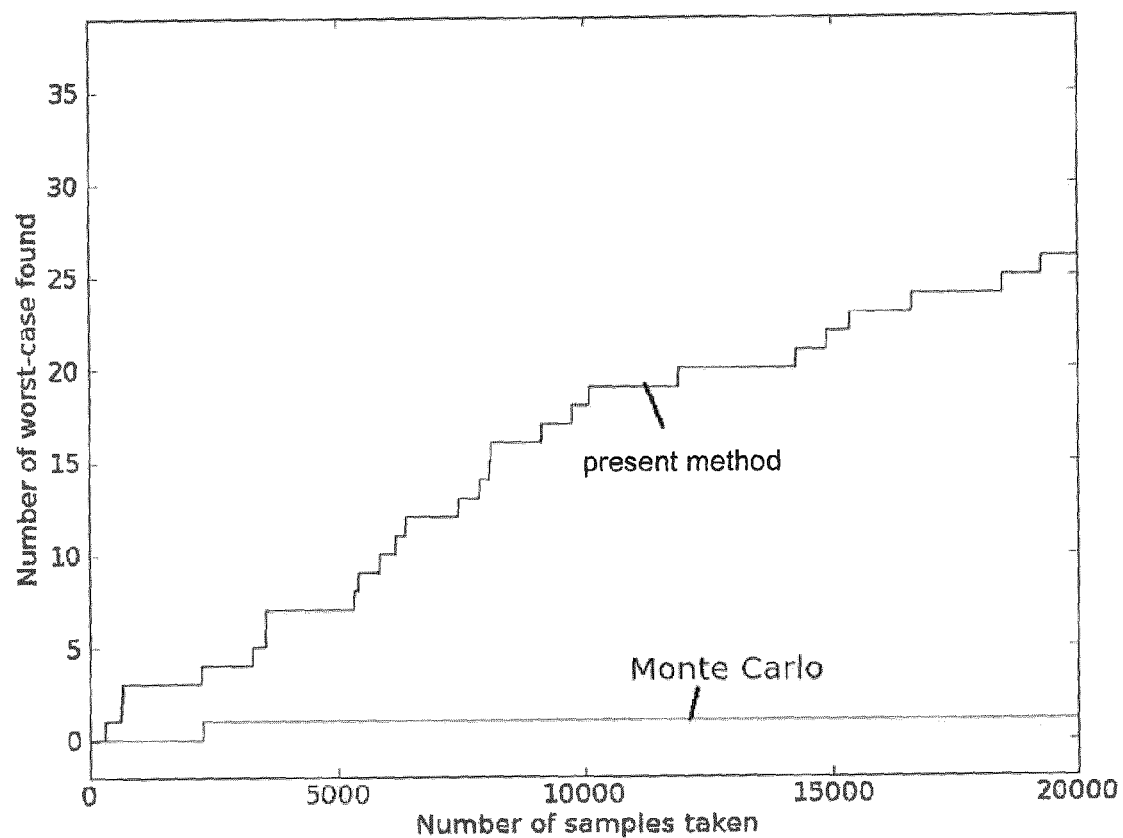
FIG. 15 shows a plot of the number of failures found as a function of sample number for the flip-flop circuit related to FIG. 14.

FIG. 14 and FIG. 15 show an application of the present method to the behavior on the flip-flop's Id current output. FIG. 14 shows that, while the curve 620, obtained through the exemplary method of FIG. 2, biases towards the extreme maximum, it has a high degree of noise. This means the underlying model is capturing the global trend, but it has significant error in capturing local trends. Despite this significant error, it is still finding failures with reasonable efficiency. Also shown in FIG. 14 is the ideal curve 622, and the curve 624, which relates to the randomly selected samples. FIG. 15 shows that after 20000 simulations, the present method has found 26 out of 100 failures.

The results shown at FIGS. 14 and 15 demonstrate how the present method is self-verifying at runtime, and how even with a poor ordering model, the method can still produce useful results. In such cases, the user/designer would be able to clearly see that the method is not producing dependable results within 20000 simulations. Given this, the designer could opt to either run additional simulations to gain more resolution, to compliment the verification with another technique such as Monte Carlo with 1 million samples followed by extrapolation, or importance sampling; or to design with some added margin to account for the uncertainty. The designer can also use high-sigma corners (process points that cause failure) discovered here to design against in a subsequent iteration. To be more specific, some of the process points that caused failures could be used as "corners", in a flow where the designer iteratively changes device sizes and gets feedback by simulating the "corners" in a circuit simulator; the designer would stop once satisfied with the performance at the corners; at this time the designer might then re-run the present method to find the new design's failure rate.

To reiterate, a key advantage of the present method is that it is not misleading due to the ability to assess the quality of its output versus sample convergence curve.

Figure 16:
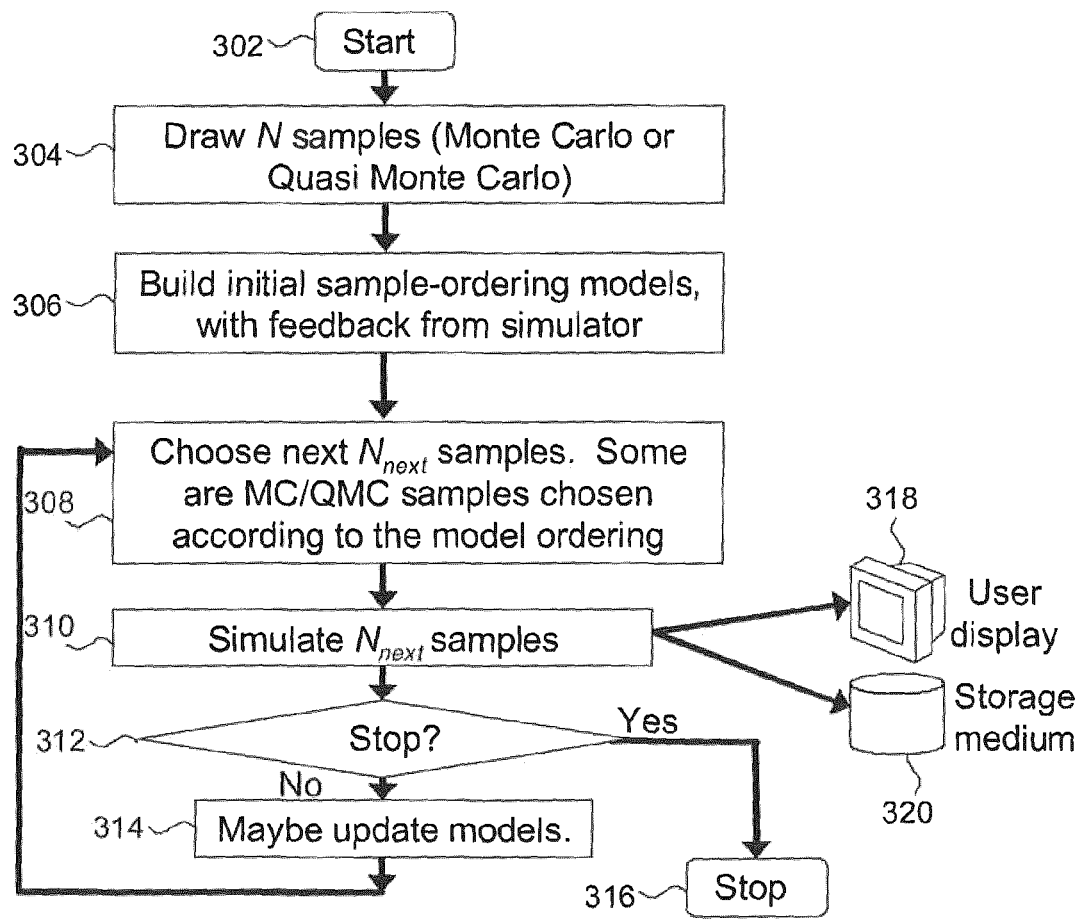
FIG. 16 shows a block diagram illustrating another embodiment of the present disclosure.

FIG. 16 is a block diagram illustrating an alternative method/system embodiment of the present invention. Compared to FIG. 2, it accommodates a wider variety of implementation choices. But both embodiments share a commonality: a set of randomly drawn samples is ordered to focus on failing cases, and then simulated in that order until all failures are found.

The next several paragraphs describe the flow of FIG. 16. Step 302 is the start. The system has the same inputs as described in the previous embodiment of FIG. 2. Then, in step 304, a set of N samples (points) are drawn from the random distribution that describes process variation of the ECD. These can be drawn using Monte Carlo sampling (also known as pseudo-random sampling), or using Quasi Monte Carlo (QMC) sampling, which is similar to Monte Carlo sampling in that it draws unbiased samples from the probability distribution. QMC is different in that it aims to generate samples that have "better spread" (lower discrepancy) in the random variable space, which can translate to lower variance in statistical estimates for the same number of samples. QMC sampling techniques can include Halton sequences (J. Halton. On the efficiency of certain quasi-random sequences of points in evaluating multi-dimensional integrals. Numerische Mathematik, 2:84-90, 1960), Hammersley sequences (J. Hammersley. Monte Carlo methods for solving multivariate problems. Annals of NY Academy of Science, 86:844-874, 1960), and more.

In FIG. 16, step 306, initial sample-ordering models are constructed. One model is constructed for each output (performance metric) of interest, or alternatively for each aim of each output (e.g. minimum aim for ascending order, maximum aim for descending order, or both). Each model's inputs are the random variables of the variation probability distribution. Each model's output is the performance value (performance metric value) it is modeling. The model can be constructed like in the method shown at FIG. 2, which involves randomly selecting a subset of the N Monte Carlo or Quasi Monte Carlo samples, simulating those, and building a regression model for each performance metric. Alternatively, the model can be constructed by ignoring the N Monte Carlo or Quasi Monte Carlo samples, and instead creating a set of input points anywhere in the input space; simulating those; and building models mapping the input points to the simulated performance values. Alternatively, each model can be constructed in adaptive fashion: some initial samples are chosen and simulated, the regression model is built, then new samples are chosen as input points where the regression model has the highest uncertainty (for example the highest variance in prediction on Gaussian process models), then those samples are simulated. The cycle of choosing samples, simulating, and measuring uncertainty is repeated until a target error is achieved. Other criterion besides modeling uncertainty may also be used, such as a weighted combination of predicted value and modeling uncertainty value. In any case, at the end of step 306, there is a set of regression models that map variation input parameters to performance outputs.

The flow proceeds to FIG. 16 step 308. The candidate Monte Carlo samples are from the N Monte Carlo samples that have not yet been simulated. In step 308, a set of $N_{next}$ samples are chosen as follows. For each regression model, each candidate sample is simulated on the model to get predicted performance values, and the samples are ordered in ascending (or descending) order of the predicted performance values. These orders, one per output (or one per aim in the case where more than one region of interest is comprised in an output), are merged into a single order (e.g., via interleaving).

Figure 17A:
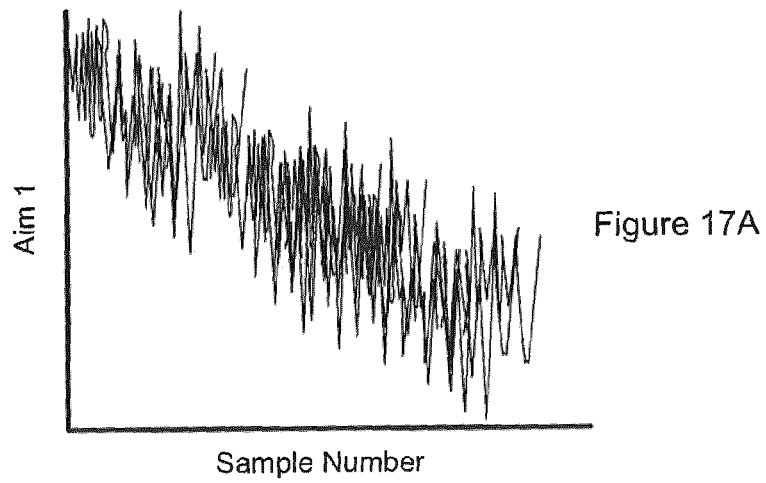
FIGS. 17A-17C show generic plots of aim values as a function of sample number.
Figure 17B:
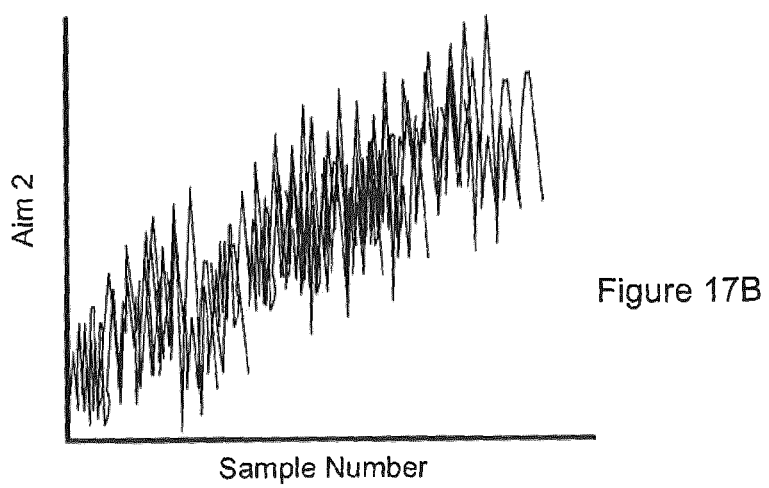
Figure 17C:
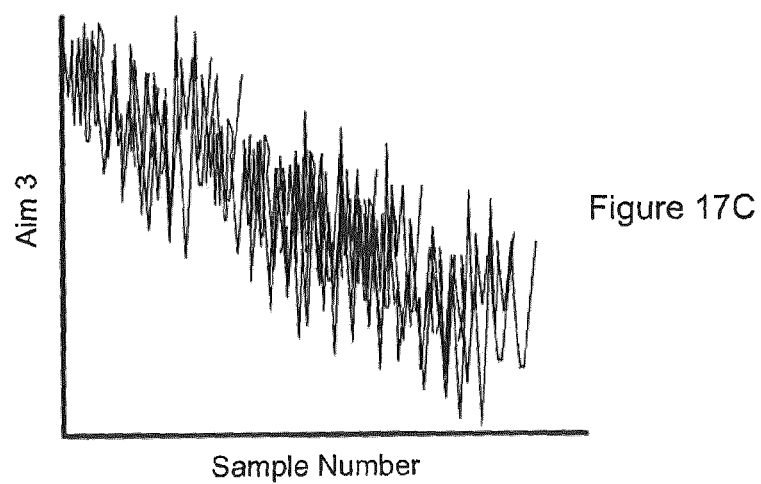

For example, in the case of three aims, aim 1 could be a maximum power of an ECD, aim 2, a minimum power of the ECD, and aim 3 the gain of the ECD. In this example, aim 1 and aim 2 would be two regions of interest, at opposite ends, of the distribution function of power. FIGS. 17A, 17B, and 17C, show ordered aims 1, 2, and 3 plotted as a function of sample number. If the ordered samples for aim 1 are: s505, s10, s1, s3, . . . , for aim 2: s12, s9, s10, s2, . . . , for aim 3: s7, s5, s8, s11, . . . , then, the interleaved samples would be s505, s12, s7, s10, s9, s5, s1, s10, s8, s3, s2, s11, etc. However, as the samples s10 occurs twice, it need not be simulated twice and can be deleted from the interleaved samples list.

In addition, simulations of non-candidate points or late-ordered may also be done. For example, new samples are chosen as input points where the models have the most error. Doing this will help the models to continually improve in regions that they are most uncertain. Or, some candidate points may be randomly selected without bias (rather than an ordering bias). Doing this gives the algorithm better expected "worst case" convergence, similar to "mixture" importance sampling which gets better expected "worst case" convergence by drawing a fraction of samples from the true distribution. The first-ordered candidates along with the additional points become the chosen $N_{next}$ samples.

In FIG. 16 step 310, the $N_{next}$ samples are simulated. The sampling and simulation will stop 312 once there is sufficient confidence that all failures are found, or another stopping criterion is met. Other stopping criteria include a maximum runtime exceeded, maximum number of samples exceeded, or finding that given the simulations so far, the ability to hit a target yield has been proven or disproven.

In FIG. 16 step 314, some of the regression models may be re-built, using the updated simulation data. This typically happens when an existing model has had high error in predicting output values, compared to simulated output values; which leads to error in prediction order.

In FIG. 16, the results of simulation and modeling are output to both the user display 318 and a storage medium 320 such as a database. In some cases, the results are output to the storage medium, and are then passed to the display. As in FIG. 2, the display 318 may show simulated output values, which simulations failed specifications, and an estimated failure rate assuming all failures are found. The failure rate may also include an estimate of upper and lower confidence interval, calculated for example with the Wilson estimate of a binomial distribution (E. B. Wilson, Probable inference, the law of succession, and statistical inference, Journal of the American Statistical Association, Vol. 22, pages 209-212, 1927), or with any other suitable type of estimate. The display may show the failure rate for each output or aim, and aggregated across all outputs (for overall failure rate). The display may show an estimate of the confidence that all failures are found, for each output or overall. The display may show a plot of simulated output value versus predicted sample order number, for each output and aim (minimum or maximum or both). Or, it may show a version that also has model-predicted output value, model-predicted upper bound, model-predicted lower bound in the plot of simulated output value vs. sample number. The display may show a plot of actual sample order number versus predicted sample number, for each output and aim. The display may show the correlation of actual versus predicted sample number, for each output and aim. The display may show all the sample values so far in a frequency plot, highlighting the predicted worst-case values for a given output and aim for example with different colors. The display may show the sensitivity of output values on process parameters, for each output, or for each output and aim. The display may show a calculated distribution for the tails of the curve and show it; approaches to calculate the distribution tails can include Extreme Value Theory, and building a 1d model mapping from performance value to output quantile value. The display may calculate a distribution for each output, not just the tails, and show it. The system to which the display is connected may include a means for the user to select any point that failed specifications, and to export those points, for use by other tools. The display may calculate representative random points at target percentile values of the output tails (e.g. the 1 e-$6^{th}$ and 1-1 e-$6^{th}$ percentile values), display those points and their output values, and export those points, for use by other tools.

An additional alternative embodiment is like the embodiment of FIG. 16, except for each sample (variation point) is simulated across a set of "worst case corners". These corners can model other uncontrollable variation such as temperature, load, power supply voltage, and statistical variation that is captured into model sets such as FF/SS/etc. (CMOS device models can have their global process variables set to model an NMOS component, which can have fast, slow, or typical behaviors, and a PMOS component, which can also have fast, slow, or typical behaviors. The CMOS device can then be analyzed, for example, at the Fast-NMOS/Fast-PMOS (FF), Fast-NMOS/Slow-PMOS (FS), Slow-NMOS/Fast-PMOS (SF), Slow-NMOS/Slow-PMOS (SS), or Typical-NMOS/Typical-PMOS (TT) global process corners. These global process corners are designed to bracket a digital circuits' key performance characteristics of speed and power.) Once a sample is simulated across these corners, the worst-case value is taken, and used for the models and elsewhere. The worst-case operator is minimum when the aim is minimum (ascending order); and maximum when the aim is maximum (ascending order). The user display may include showing results across all worst-case corners.

A further alternative embodiment is like the embodiment of FIG. 16, except there are other uncontrollable variation parameters that can be considered in a worst-case sense, and they are handled as extra input variables to the regression model. These parameters can include temperature, load, power supply voltage, and model sets such as FF/SS/etc. FIG. 16, step 306 involves drawing input points that are well-spread in the union of the random variation space with the "worst-case" variation space, and building models that map the union of random and worst-case parameters to output.

Embodiments of the invention have been described in relation to electrical systems (ECDs). However, as a worker skilled in the art will understand, the present disclosure is also applicable to systems other than electrical systems. For example, financial systems and weather systems, amongst others, can also use the method and system described herein.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Figure 18:
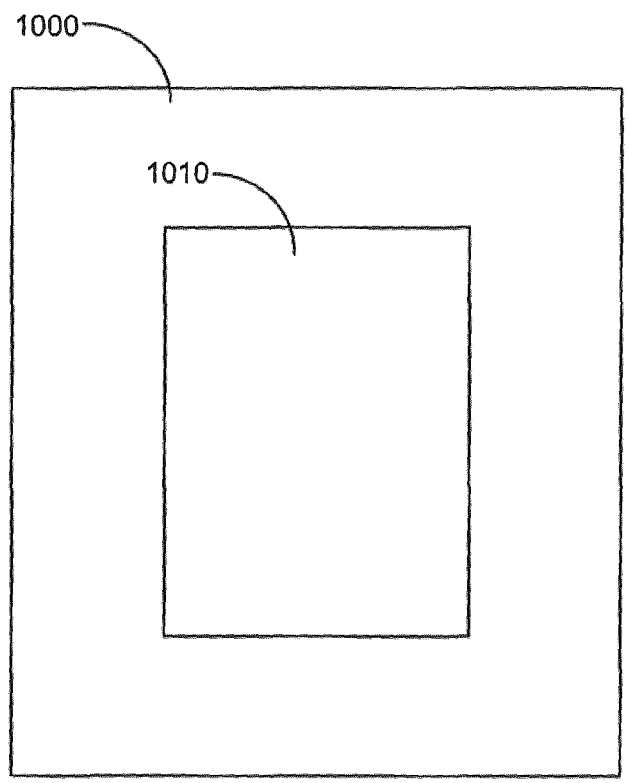
FIG. 18 shows a non-transitory, tangible computer-readable medium that has recorded thereon instructions for execution by a computer to carry out a method of the present disclosure.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks. FIG. 18 shows a computer-readable medium 1000 that has recorded thereon instructions 1010 for execution by a computer to carry out a method of the present disclosure.

The above-described embodiments are intended to be examples only. Alterations, modifications and variations can be effected to the particular embodiments by those of skill in the art without departing from the scope, which is defined solely by the claims appended hereto.

The invention claimed is:

1. A non-transitory, tangible computer-readable medium having recorded thereon instructions for execution by a computer to carry out a method to identify rare-event failures of an electrical circuit design (ECD), the ECD having associated thereto process variables and performance metrics, the performance metrics being dependent on the process variables, the process variables having a probability distribution, the method comprising:

generating a set of points from the probability distribution of the process variables;

selecting a subset of points from the set of points;

simulating the ECD for each point of the subset of points, to obtain simulation data;

in accordance with the simulation data, calculating a value of a performance metric for each point of the subset of points, to obtain a set of performance metric values, the performance metric having associated thereto a target value;

in accordance with the set of performance metric values and with the values of the process variables for each point of the subset of points, building a model of the performance metric as a function of the process variables;

in accordance with the model, obtaining, for remaining points of the set of points, respective modeled performance metric values and, ordering the remaining points as a function of their respective modeled performance metric values, to obtain a set of ordered remaining points; and displaying a count of a number of ECD failures, to obtain a displayed count of ECD failures by, starting with a selected ordered remaining point from the set of ordered remaining points, iteratively repeating the following actions a-e until a stop condition is met:
(a) simulating the selected ordered remaining point to obtain simulation data of the selected ordered remaining point;
(b) calculating, in accordance with the simulation data of the selected ordered remaining point, a value of the performance metric of the selected ordered remaining point;
(c) comparing the value of the performance metric of the selected ordered remaining point to the target value;
(d) if the value of the performance metric of the selected ordered remaining point does not meet the target value, augmenting the displayed count of ECD failures; and,
(e) in the next iteration of actions a-e, using the next ordered remaining point in the set of ordered remaining points as the selected ordered remaining point.

2. The non-transitory, tangible computer-readable medium of claim 1 wherein the remaining points are distinct from points of the subset of points.

3. The non-transitory, tangible computer-readable medium of claim 1 wherein a total number of points of the set of points is determined in accordance with a target yield of the ECD.

4. The non-transitory, tangible computer-readable medium of claim 1 wherein a failure rate of the ECD or a yield of the ECD is estimated in accordance with the number of ECD failures, and a total number of points of the set of points.

5. The non-transitory, tangible computer-readable medium of claim 4 wherein the method further comprises automatically determining if all ECD failures have been found.

6. The non-transitory, tangible computer-readable medium of claim 4 wherein the method further comprises determining a confidence interval for the failure rate of the ECD or the yield of the ECD.

7. The non-transitory, tangible computer-readable medium of claim 1 wherein the model is a regression model that includes at least one of a linear model, a polynomial model, a spline model, a Gaussian process model, a neural network, a Multivariate Adaptive Regression Spline model, and an Fast Function Extraction model.

8. The non-transitory, tangible computer-readable medium of claim 1 wherein, subsequent an iteration of actions a-d, rebuilding of the model is effected based on all simulated points, to obtain a rebuilt model and, the points that have yet to be simulated are reordered in accordance with the rebuilt model.

9. The non-transitory, tangible computer-readable medium of claim 1 further comprising displaying a plot, the plot including a curve showing the values of the performance metric for simulated points as a function of an order in which the points were simulated.

10. The non-transitory, tangible computer-readable medium of claim 1 wherein the method further comprises displaying a plot, the plot including a curve of a probability distribution of the performance metric.

11. The non-transitory, tangible computer-readable medium of claim 10 wherein the curve shows at least one extreme portion of a probability distribution of the performance metric.

12. The non-transitory, tangible computer-readable medium of claim 1 wherein the method further comprises obtaining additional points in a space defined by the process variables, the additional points being outside the set of points.

13. The non-transitory, tangible computer-readable medium of claim 12 wherein the method further comprises:
simulating the ECD at the additional points to obtain additional simulation data;
in accordance with the additional simulation data, calculating additional performance metric values; and,
modifying the model in accordance with the additional performance metric values.

14. The non-transitory, tangible computer-readable medium of claim 12 wherein the method further comprises:
estimating an error or uncertainty of the model, to obtain an estimated error or uncertainty; and
obtaining the additional points in accordance with the estimated error or uncertainty.

15. The non-transitory, tangible computer-readable medium of claim 1 wherein displaying the count of the number of ECD failures includes displaying in a plot the count of the number of ECD failures.

16. The non-transitory, tangible computer-readable medium of claim 1 wherein generating the set of points from the probability distribution of the process variables includes sampling the probability distribution of the process variables.

17. A non-transitory, tangible computer-readable medium having recorded thereon instructions for execution by a computer to carry out a method to identify rare-event occurrences of an electrical circuit design (ECD), the ECD having associated thereto process variables and performance metrics, the performance metrics being dependent on the process variables, the process variables having a probability distribution, the method comprising:
generating a set of points from the probability distribution of the process variables;
selecting a subset of points from the set of points;
simulating the ECD for each point of the subset of points, to obtain simulation data;
in accordance with the simulation data, calculating a value of a performance metric for each point of the subset of points, to obtain a set of performance metric values;
in accordance with the set of performance metric values and with the values of the process variables for each point of the subset of points, building a model of the performance metric as a function of the process variables;
in accordance with the model, obtaining, for remaining points of the set of points, respective modeled performance metric values and, ordering the remaining points as a function of their respective modeled performance metric values, to obtain a set of ordered remaining points; and
displaying a plot of a distribution of the values of the performance metric, to obtain a displayed plot by, starting with a selected ordered remaining point from the set of ordered remaining point, iteratively repeating the following actions a-d until a stop condition is met:
(a) simulating the selected ordered remaining point to obtain simulation data of the selected ordered remaining point;
(b) calculating a value of the performance metric of the selected ordered remaining point in accordance with the simulation data of the selected ordered remaining point;
(c) incorporating the value of the performance metric of the selected ordered remaining point into the plot of the distribution of the values of the performance metric; and
(d) in the next iteration of actions a-d, using the next ordered remaining point in the set of ordered remaining points as the selected ordered remaining point.

18. A non-transitory, tangible computer-readable medium having recorded thereon instructions for execution by a computer to carry out a method to identify rare-event failures of an electrical circuit design (ECD), the ECD having associated thereto process variables and performance metrics, the performance metrics being dependent on the process variables, the process variables having a probability distribution, the method comprising:
generating a set of points from the probability distribution of the process variables;
selecting a subset of points from the set of points;
simulating the ECD for each point of the subset of points, to obtain simulation data;
in accordance with the simulation data, for at least two of the performance metrics of the ECD, calculating a value of each of the at least two performance metrics for each point of the subset of points, to obtain at least two sets of performance metric values, each set of performance metric values corresponding to a respective one of the at least two performance metrics;
in accordance with the at least two sets of performance metric values and with the values of the process variables for each point of the subset of points, building a model for each of the at least two performance metrics as a function of the process variables, each of the at least two performance metrics having associated thereto at least one target value;
for each target value of each performance metric, in accordance with the model of each of the at least two performance metrics, obtaining, for remaining points of the set of points, respective modeled performance metric values and, ordering the remaining points as a function of their respective modeled performance metric values to obtain sets of ordered remaining points, a number of sets of ordered remaining points being equal to a number of the target values, an order of each set of ordered remaining points being set in accordance with its related target value;

interleaving the sets of ordered remaining points to obtain a set of interleaved ordered remaining points;

displaying a count of a number of ECD failures, to obtain a displayed count of ECD failures by, starting with a selected interleaved ordered remaining point of the set of interleaved ordered remaining points, iteratively repeating the following actions a-e until a stop condition is met:

(a) simulating the selected interleaved ordered remaining point to obtain simulation data of the selected interleaved ordered remaining point;

(b) calculating, in accordance with the simulation data of the selected interleaved ordered remaining point, a calculated value for each the at least two performance metrics;

(c) comparing each target value to the calculated value of its associated performance metric;

(d) for each target value, if the target value is not met by the calculated value of its associated performance metric, augmenting the displayed count of the ECD failures; and (e) in the next iteration of actions a-e, using the next interleaved ordered remaining point in the set of interleaved ordered remaining points as the selected interleaved ordered remaining point.

* * * * *